United States Patent [19]

Pesch

[11] 4,447,180
[45] May 8, 1984

[54] CHUCK WITH SAFETY CUTOUT

[75] Inventor: Karl Pesch, Dillingen, Fed. Rep. of Germany

[73] Assignee: Röhm GmbH, Sontheim, Fed. Rep. of Germany

[21] Appl. No.: 341,582

[22] Filed: Jan. 21, 1982

[30] Foreign Application Priority Data

Jan. 23, 1981 [DE] Fed. Rep. of Germany ....... 3102099

[51] Int. Cl.³ .............................................. B23C 9/00
[52] U.S. Cl. .................................... 409/232; 92/5 R; 279/4; 279/111
[58] Field of Search .................... 279/4, 110, 111, 121; 409/232, 234; 92/5 R, 106; 82/40 R

[56] References Cited

U.S. PATENT DOCUMENTS

| | | | |
|---|---|---|---|
| 3,908,383 | 9/1975 | Selden | 279/4 X |
| 3,926,446 | 12/1975 | Rohm | 92/106 X |
| 3,986,437 | 10/1976 | Lioux | 92/5 R |
| 4,249,459 | 2/1981 | Pruden | 279/4 X |
| 4,387,907 | 6/1983 | Hiestand | 409/232 X |

*Primary Examiner*—William R. Briggs
*Attorney, Agent, or Firm*—Karl F. Ross; Herbert Dubno

[57] ABSTRACT

A power chuck has a chuck body rotatable about an axis, forming at least one cylinder, and having a front face. A plurality of jaws are displaceable radially on the front face between radially inner and outer end positions by an operating member axially displaceable on the body between a pair of axially offset end positions. Mechanism between the jaws and the member displaces the jaws toward the radial inner positions on displacement of the member in a first axial direction and displaces the jaws toward the radial outer positions on displacement of the member in a second axial direction opposite the first direction on the body. A drive piston the one cylinder of the body is fixed on and axially jointly displaceable with the member and forms in the one cylinder at least one compartment pressurizable to urge the drive piston and the operating member in one of the axial directions. A control piston is displaceable in another cylinder in the body between a chuck-ready position and a chuck-unready position and a spring is braced against the control piston and urges same into the chuck-unready position. Passages between the cylinders conduct hydraulic or pneumatic fluid therebetween to urge the control piston into the chuck-ready position when the compartment is pressurized and formations between the control piston and operating member hold the control piston in the chuck-unready position when the operating member or the jaws are in either of their end positions.

7 Claims, 5 Drawing Figures not firmly clamped. In addition the system prevents the lathe from being powered on when the chuck is not ready.

According to this invention the other cylinder of the body is radial and the control piston is radially displaceable therein between its chuck positions. The formations that hold the control piston in the chuck-unready position when the jaws are in their end positions include a nonradially projecting boss on the control piston and a nonradially projecting formation provided on the operating member and engageable radially with the boss. These formations therefore positively lock the control piston in the chuck-unready position when they engage each other.

The spring means of this invention urges the control piston radially inward into the chuck-unready position. The formation on the operating member is engageable radially outwardly with the boss of the control piston. The operating member is formed with an axially extending and radially outwardly open groove having an axially and radially extending side wall formed with a nonradial boss constituting the formation of the operating member. The control piston has a radially inwardly extending piston rod formed with the nonradial boss of the control piston. In this manner radially outwardly effective centrifugal forces do not interfere with the proper functioning of the assembly. Such forces are not strong at the control piston close to the rotation axis, and in any case are rarely great as large power lathe chucks of the type of the chuck of the instant invention are not usually employed at high speed.

In addition the signal means include inclined camming formations on the operating member and engageable with the nonradial boss of the control piston at the end positions of the operating member for camming the control piston into the chuck-unready position. These camming formations are inclined relatively shallowly so that even if the drive-piston compartment is sufficiently pressurized to move the control piston to the chuck-ready position, they can cam the control piston oppositely against this force into the chuck-unready position.

The chuck according to this invention further has an angularly displaceable ring on the chuck body and means interconnecting the ring and control piston for converting radial displacement of the control piston into angular displacement of the ring. This ring can itself constitute a visual indicator of whether the chuck is ready or unready. It is also possible for the ring to be magnetizable and formed with at least one radially throughgoing window. In this case the body is provided with at least one nonmagnetic insert exposed at the window in one of the chuck positions and at least partially covered by the ring in the other of the chuck positions. The sensor means can therefore be a magnetic coil-type detector juxtaposed with the ring axially level with the nonmagnetic inserts. When this magnetic sensor detects a nonsteady field, which would happen when the window is aligned with the nonmagnetic insert, it can generate an output indicating that the chuck is not ready, or can stop generating one that indicates it is ready. When the window is moved out of alignment with the nonmagnetic insert, the field will remain steady as the chuck rotates, so that the sensor will detect a steady field and react oppositely.

It is also possible according to this invention for the control piston to carry a magnet and the chuck body to be formed with a magnetic window—a hole or a cover of magnetically transparent material—radially outwardly of the magnet. In this case the field detected by the sensor wouldgrow stronger as the control piston moved out into the chuck-unready position. In fact an analog output could be produced which would be proportional to the pressurization of the drive-piston compartment when the operating member is not in case of its end positions normally corresponding to the radially inner and outer positions of the chuck jaws.

In a double-acting chuck according to this invention, that is a chuck that can move its jaws radially inwardly to clamp a workpiece externally between the jaws or radially outwardly to engage an inner periphery of a workpiece and thereby clamp it internally, the drive piston subdivides the one cylinder into two axially oppositely effective pressurizable compartments. The passages are connected to a double check valve having two inputs and one output. The passages include respective input passages extending from the compartments to the inputs and an output passage extending from the output to the other cylinder. The double check valve is the type which only permits flow between the more pressurized of its inputs and its output, and which blocks off all flow to the less pressurized of its inputs. With this system the control piston will therefore respond to the position of the operating member, as before, and to the effective one of the two piston compartments.

The chuck according to this invention therefore senses actuation pressure in a power chuck right off the drive-piston compartment. Any blockages upstream will be sensed, and such sensing can be counted on to remain effective and sensitive for a long time. In addition the system of this invention indicates when the jaws are in their end positions, or when the operating member is in its end positions, to prevent the lathe operator from starting up the lathe drive motor since when in their end positions experience has shown a dangerous condition often exists.

DESCRIPTION OF THE DRAWING

The above and other features and advantages will become more readily apparent from the following, reference being made to the accompanying drawing in which.

SPECIFIC DESCRIPTION

Figure 1:
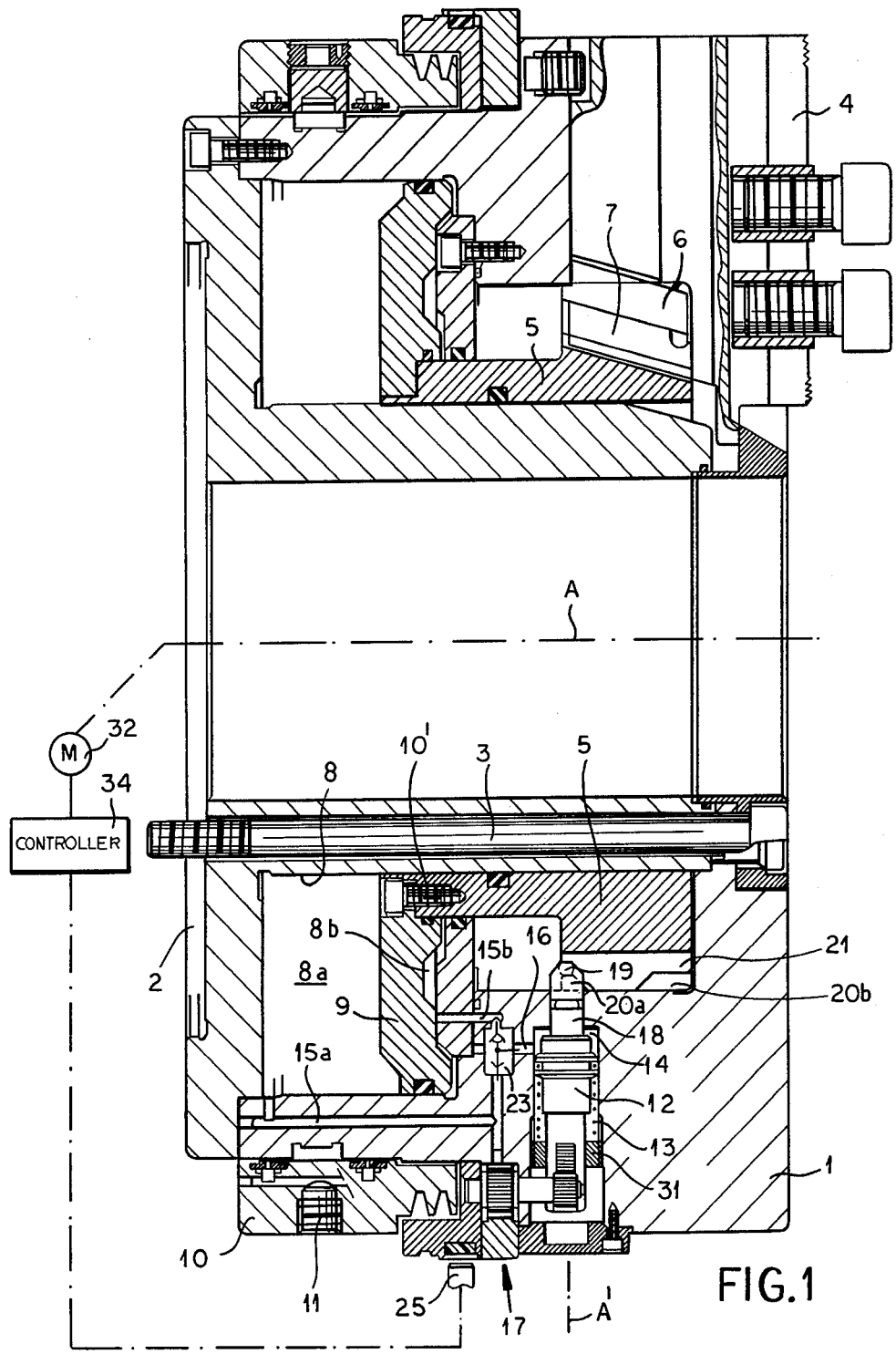
FIG. 1 is an axial section through a chuck according to this invention with the control piston in the chuck-unready position.
Figure 2:
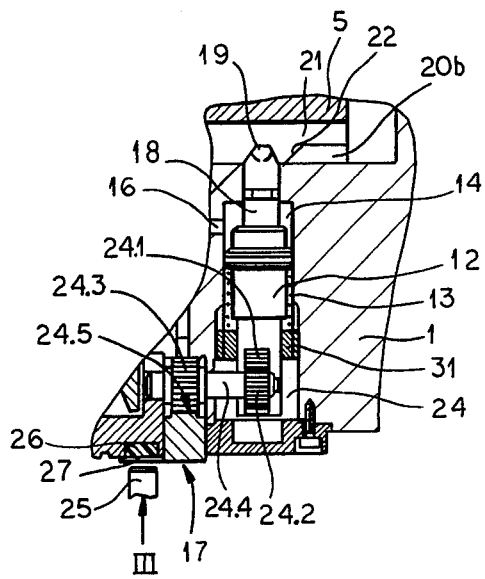
FIG. 2 is a large-scale view of a detail of FIG. 1, but showing the control piston in the chuck-ready position.
Figure 3A:
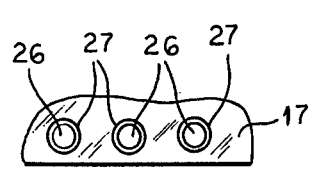
FIGS. 3a and 3b are detail views taken in the direction of arrow III of FIG. 2 and respectively showing the chuck in the chuck-unready and chuck-ready positions.
Figure 3B:
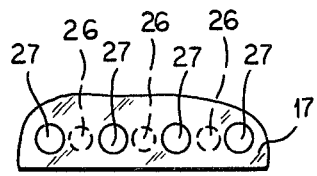

A chuck according to this invention as seen in FIGS. 1 and 2 has a chuck body 1 formed on its rear face with a recess 2 so that it can be mounted on the headstock of a lathe. Bolts 3 secure the body 1 to the headstock so it can be rotated by a drive motor 32 about an axis A of the chuck body. Radially displaceable jaws 4, shown in FIG. 1 in their outermost positions, are radially displaceable on the front face of the body 1 by means of an axially displaceable operating sleeve member 5 carried in the body 1. To this end the member 5 and jaws 4 are formed with interengaging hook wedges 6 and 7 that convert the axial displacement of the member 5 into

CHUCK WITH SAFETY CUTOUT

FIELD OF THE INVENTION

The present invention relates to a lathe chuck. More particularly this invention concerns a power lathe chuck provided with some type of indicator intended to warn when the chuck should not be rotated.

BACKGROUND OF THE INVENTION

A lathe chuck has a chuck body that is held in a lathe headstock and/or tailstock for rotation about an axis. A plurality of radially displaceable jaws on one axial face of the body can be moved between radially outer and inner positions to grip and to release a workpiece or even a tool.

In serial production of large lathed workpieces in a commercial shop, it is standard for the lathe chuck to have an operating member that is displaced at least in part by fluid pressure. Even when the operating member, which usually extends along the lathe axis out the back end of the pedestal it is associated with, is itself actuated from the end of the lathe, it is standard to use a hydraulic or pneumatic boost. The mechanical and normally manual actuation is carried out as the workpiece is mounted in the chuck and in the last stages of dechucking it, and the hydraulic or pneumatic arrangement built inside the chuck body is pressurized or depressurized to increase the force in the desired direction once the workpiece is in proper position.

Obviously the results of a workpiece being brought up to machining speed in a lathe and coming loose from the lathe can be disastrous, leading often to serious injury. Hence it is standard to provide a control system that prevents the lathe drive motor that rotates the headstock about its axis and thereby rotationally entrails the workpiece and tailstock, if provided, from starting unless it receives a signal indicating the chuck is ready or ceases to receive one which indicates that it is unready. The simplest systems simply use a pressure valve in the line to the chucks, so that unless the control system senses pressure in these lines, indicating the chucks are pressurized, it will not be possible to start the lathe drive motor. It is also known to provide on the outside of the chuck an indicator that shows the position of the operating member and to provide even for automatic reading of such indication.

Such systems have not prevented serious accidents. They all have the enormous failing that when the chuck jaws come to their end positions, it is possible for the chuck to be fully pressurized without the jaws securely engaging a workpiece. Another problem is related to the pressure-sensitive system, which occasionally indicates adequate pressurization that is not actually getting into the drive cylinder on the chuck body, but that is blocked somewhat upstream therefrom but downstream from the measuring location.

OBJECTS OF THE INVENTION

It is therefore an object of the present invention to provide an improved lathe chuck.

Another object is the provision of such a lathe chuck which overcomes the above-given disadvantages.

A further object is to provide a lathe chuck that can cooperate with a known control arrangement—a machine operator or an automatic controller—to ensure that a lathe is not started up except when its chuck jaws are braced against a workpiece.

SUMMARY OF THE INVENTION

These objects are attained according to the instant invention in a power chuck of the standard type, that is having a chuck body rotatable about an axis, forming at least one cylinder, and having a front face. A plurality of jaws are displaceable radially on the front face between radially inner and outer end positions by an operating member axially displaceable on the body between a pair of axially offset end positions. Mechanisms between the jaws and the member displaces the jaws toward the radial inner positions on displacement of the member in a first axial direction and displaces the jaws toward the radial outer positions on displacement of the member in a second axial direction opposite the first direction on the body. A drive piston in one of the cylinders of the body is fixed on and axially jointly displaceable with the member and forms in the cylinder at least one compartment pressurizable to urge the drive piston and the operating member in one of the axial directions. According to this invention a control piston is displaceable in another cylinder in the body between a chuck-ready position and a chuck-unready position and a spring is braced against the control piston and urges same into the chuck-unready position. Means including passages between the cylinders urges the control piston into the chuck-ready position when the compartment is pressurized and signal means including formations between the control piston and operating member holds the control piston in the chuck-unready position when the jaws or the operating member is in either of its end positions.

Thus with the system according to the invention an indicator—either constituted by or operated by the control piston—is in a chuck-unready position when the compartment of the drive piston is depressurized and when the operating member is in a position corresponding to the end positions of the jaws, and is in a chuck-ready position when the jaws are not in these end positions and when the compartment of the drive piston is pressurized. If the compartment of the drive piston is indeed pressurized but the jaws are in the end positions, the control piston will be in the chuck-unready position, since this condition could be one simply where the jaws were at the end of their travel but were still not safely seated on a workpiece. When the jaws are not in these end positions the control piston will only move to the chuck-unready position when the drive-piston compartment is pressurized, indicating the jaws are seated firmly on a workpiece.

The chuck according to the instant invention further comprises drive means for rotating the chuck body about the axis, sensor means radially spaced from the chuck axially level with the control piston for sensing the position of same and for generating an output when the piston is in the chuck-unready position, and control means connected to the sensor means and to the drive means for preventing rotation of the body by the drive means when the sensor means generates the output. The output can be a signal or the cessation of a signal. Thus the system of this invention can operate wholly automatically to shut down a lathe while it is operating if either the chuck actuation pressure fails in the chuck, which would allow the chuck to loosen, or the jaws of the chuck move into an end position, which indicates that the workpiece has been crushed or broken and is radial displacement of the jaws 4. A conventional connection ring 10 rides on the body 1 and is formed with a pair of connection ports 11 connected to respective compartments 8a and 8b defined by a drive piston 9 in a cylinder of the body 1. This piston 9 is itself fixed on the operating member 5 so that it can displace same. Hydraulic or pneumatic lines are connected to the ports 11 to pressurize the respective compartments 8a and 8b.

A manual actuation rod can extend axially from the chuck body 1 and be connected to the sleeve 5 so that it also can displace same, although it is entirely possible for the sleeve 5 to be displaced exclusively by pressurization of one of its compartments 8a and 8b. Either way the chuck according to this invention externally clamps a workpiece by moving its jaws 4 radially inwardly with an axially leftward (FIG. 1) displacement of the member 5, which can be effected by pressurization of the chamber 8b. Pressurization of the chamber 8a will oppositely urge the piston 9 and member 5 to open the chuck or dechuck a workpiece. In the case of an internally held workpiece the opening and closing motions are of course reversed.

According to the instant invention the body 1 is formed with a small-diameter cylinder 14 centered on a radial axis A' and provided with a small control piston 12. A spring 13 is braced against a ring 31 and urges the control piston 12 radially inwardly into the chuck-unready position of FIG. 1. Respective input passages 15a and 15b extend from the compartments 8a and 8b to respective inputs of a double check valve 23. An output passage 16 extends from the output of this valve to the compartment of the cylinder 14. Thus the pressure of whichever of the compartments 8a and 8b is higher will be applied to the piston 12 to urge it radially outward against the force of the spring 13 into the chuck-ready position of FIG. 2. The amount of hydraulic or pneumatic pressure necessary to displace the piston 12 into the outer chuck-ready position of course is established by the compression of the spring 13. It is normally set to be that pressure deemed necessary for the chuck to get a safe grip on the workpiece.

A piston rod 18 extends radially inwardly from the piston 12 into an axially extending and radially outwardly open slot 21 formed in the operating member 5. The inner end of this piston rod 18 is formed with a laterally projecting boss 19 that can radially engage either of two axially spaced and laterally projecting formations 20a and 20b on the member 5 in the groove 21. As best seen in FIG. 2 each of these formations 20a and 20b has an inclined camming ramp 22 that can engage radially outside the boss 19 even in the outer or chuck-ready position.

Thus if the operating member 5 moves fully axially toward the front or to the right as seen in FIGS. 1 and 2 the ramp 22 of the formation 20a will engage under the boss 19 and move the piston 12 inwardly into the chuck-unready position. This can even happen when the cylinder 14 is under high pressure radially inside the piston 12, since the angle of the ramp 22 is so shallow that a high mechanical advantage is gained, one sufficient to overcome any normally encountered radially outwardly effective hydraulic or pneumatic force on the piston 12. Similarly if the member moves fully axially toward the rear or the the left as seen in FIGS. 1 and 2 the ramp 22 of the formation 20b will move the piston 12 inwardly into the chuck-unready position. The wedge-hooks 6 and 7 positively interlock the jaws 4 and member 5, so that their relative positions are closely related. It is for this reason that the device is made to respond to the position of the operating member 5 when it is actually the position of the jaws 4 that is critical. The operating member 5 is much more accessible, and its position will be strictly related to that of the jaws 4, so that operating off it is as good as operating off the jaws 4.

The other side of the piston 12 is connected via a transmission 24 to an operating or indicator ring 17 on the body 1. The piston 12 is formed with a rack 24.1 that meshes with a pinion 24.2 carried on a shaft 24.4 that extends parallel to the axis A. Another gear or pinion 24.3 is carried on the shaft 24 and meshes with a rack 24.5 formed on the inner periphery of the ring 17. Thus the radial position of the control piston 12 is directly related to the angular position of the ring 17. To this end the ring 17 can simply have a pointer alignable with legends "Chuck ready." and "Chuck not ready." inscribed on the body 1 at the appropriate angularly offset positions of the ring 17.

FIG. 2 shows, however, how the chuck body is provided adjacent the ring 17 with three angularly spaced nonmagnetic plugs or inserts 26, here of a synthetic resin. The chuck body 1 and the ring 17 are both of high-grade machine steel and are, hence, magnetizable. The ring 17 is formed with windows 27 that can be aligned with the nonmagnetic inserts 26. These windows 27 are perfectly radially aligned with the nonmagnetic inserts 26 in the chuck-unready position and are perfectly aligned with them in the opposite chuck-ready position. Between these two end positions they will more or less overlap. A coil-type magnetic sensor 25 connected to a suitable electronic controller 34 itself connected to the drive motor 32 (see FIG. 2) is fixed adjacent the chuck body 1 axially level with the angularly extending row of inserts 26. Circuitry in the controller 34 stops or prevents operation of the drive motor 32 when the sensor 25 detects an excessively varying magnetic field or permeability, which it will do when the chuck body 1 is rotating and the windows 27 are aligned with the inserts 26 in the chuck-unready position. When the field or magnetic permeability does not vary substantially, which will happen when the chuck body 1 is rotating and the ring 17 covers the shields the inserts 26 in the chuck-ready position, it will allow operation of the motor 32. In this manner the position of the control piston 12 is read automatically.

Figure 4:
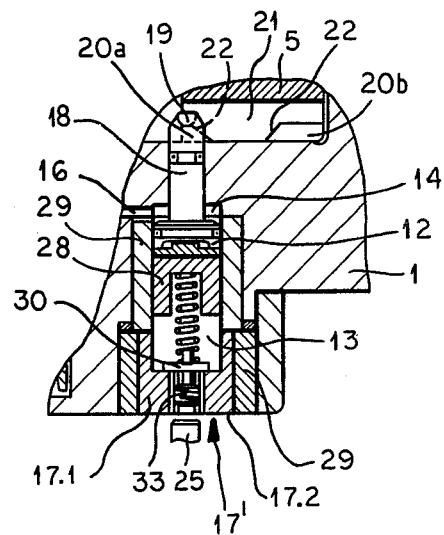
FIG. 4 is a section similr to FIG. 2, but showing another arrangement according to this invention.

FIG. 4 shows a system wherein the piston 12 carries, instead of a rack 24.1, a permanent magnet 28 and wherein the chuck body 1 is provided with a brass lining or guide 29 in the cylinder 14 and to either axial side of the ring 17'. This ring 17' itself is formed of two axially spaced ring halves 17.1 and 17.2 that are separated by a gap 30 so the field of the magnet 28 can be sensed outside the chuck body 1 by the sensor 25. In addition here the spring 13 is carried on an abutment 30 carried on a screw 33 that is screwed radially in the ring 17' and that therefore can be adjusted from outside to control the compression of the spring 13 and, therefore, the reaction pressure for displacement of the piston 12 into the outer chuck-ready position. The screw 33 is of a magnetically transparent material such as nylon so it does not interfere with reading of the field of the magnet 28 by the sensor 25, which itself works without even contacting the chuck.

The system according to this invention can therefore prevent operation of the lathe it is incorporated into when the chuck jaws are in their extreme inner or outer positions. It is well known that a chuck is not to be used when it is clamping in these positions since it is probably exerting most of its force pushing the jaws against their end stops, and not pushing the jaws against the workpiece. Similarly the lathe cannot be used when neither of the chambers 8a or 8b is sufficiently pressurized, which would also indicate that the workpiece is being gripped with insufficient force.

I claim:

1. A power chuck comprising:
    a chuck body rotatable about an axis, forming an axially extending cylinder and a radially extending cylinder, and having a front face;
    drive means for rotating said chuck body about said axis;
    a plurality of jaw members displaceable radially on said front face between a pair of radially inner and outer end positions;
    an operating member axially displaceable on said body between a pair of axially offset end positions;
    mechanism between said jaw members and said operating member for displacing said jaw members toward said radial inner positions on displacement of said operating member in a first axial direction and for displacing said jaw members toward said radial outer positions on displacement of said operating member in a second axial direction opposite said first direction on said body;
    a drive piston in the axial cylinder of said body, fixed on and axially jointly displaceable with said operating member and forming in said axial cylinder at least one compartment pressurizable to urge said drive piston and said operating member in one of said axial directions;
    a control piston displaceable radially in the radial cylinder between a chuck-ready position and a chuck-unready position;
    a spring braced against said control piston and urging same radially inward into said chuck-unready position;
    means including passages between said cylinders for urging said control piston into said chuck-ready position when said compartment is pressurized;
    signal means including
        a nonradially projecting boss on said control piston,
        a nonradially projecting formation on said operating member engageable radially outward with said boss only in said end positions on said members, and
        inclined camming formations on said operating member and engageable with said nonradial boss of said control piston at said end positions of said operating member for camming said control piston into said chuck-unready position and for holding said control piston in said chuck-unready position and generating an output when said one of said members is in either of its said end positions; and
    control means connected to said signal means and to said drive means for preventing rotation of said body by said drive means when said signal means generates said output.

2. The chuck defined in claim 1 wherein said signal means includes
    sensor means radially spaced from said chuck axially level with said control piston for sensing the position of same and for generating said output when said piston is in said chuck-unready position.

3. The chuck defined in claim 1 wherein said operating member is formed with an axially extending and radially outwardly open groove having an axially and radially extending side wall formed with a nonradial boss constituting said formation of said operating member, said control piston having a radially inwardly extending piston rod formed with said nonradial boss of said control piston.

4. The chuck defined in claim 1, further comprising an angularly displaceable ring on said chuck body and means interconnecting said ring and control piston for converting radial displacement of said control piston into angular displacement of said ring.

5. The chuck defined in claim 4 wherein said ring is magnetizable and is formed with at least one radially throughgoing window, said body being provided with at least one nonmagnetic insert exposed at said window in one of said chuck positions and at least partially covered by said ring in the other of said chuck positions.

6. The chuck defined in claim 1 wherein said control piston carries a magnet and said chuck body is formed with a magnetic window radially outwardly of said magnet.

7. The chuck defined in claim 1 wherein said drive piston subdivides said axial cylinder into two axially oppositely effective pressurizable compartments, said means including said passages comprising:
    a double check valve having two inputs and one output;
    respective input passages extending from said compartments to said inputs; and
    an output passage extending from said output to said radial cylinder.

* * * * *